US006646017B1

(12) United States Patent
Klipper et al.

(10) Patent No.: US 6,646,017 B1
(45) Date of Patent: *Nov. 11, 2003

(54) PROCESS FOR THE PREPARATION OF LOW-BLEEDING CATION EXCHANGERS

(75) Inventors: Reinhold Maria Klipper, Köln (DE); Rudolf Wagner, Köln (DE); Olaf Halle, Köln (DE); Klaus Rall, Köln (DE); Holger Lütjens, Köln (DE)

(73) Assignee: Bayer Aktiengesellschaft, Leverkusen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,125

(22) Filed: Oct. 21, 1997

(30) Foreign Application Priority Data

Oct. 24, 1996 (DE) .......................... 196 44 227

(51) Int. Cl.⁷ ................................................ C08F 8/36
(52) U.S. Cl. ........................................................ 521/33
(58) Field of Search ................. 210/681, 692; 521/33, 37; 525/353

(56) References Cited

U.S. PATENT DOCUMENTS

| 2,500,149 A | 3/1950 | Boyer ........................ 260/79.3 |
| 2,597,438 A | 5/1952 | Bodamer .................... 260/79.3 |
| 2,953,532 A | 9/1960 | Mühlberg ..................... 260/2.2 |
| 3,218,301 A | 11/1965 | Moody et al. .............. 260/79.3 |
| 3,238,153 A | 3/1966 | Hagge et al. ................. 260/2.2 |
| 4,380,590 A | * 4/1983 | Chong ........................... 521/33 |
| 4,666,776 A | * 5/1987 | Lange et al. ................... 521/33 |
| 5,081,160 A | * 1/1992 | Strom et al. ................... 521/33 |

FOREIGN PATENT DOCUMENTS

| DE | 1 227 431 | 10/1966 |
| DE | 196 44 217 A1 | 6/1997 |
| EP | 0 009 395 A1 | 4/1980 |
| EP | 0 361 685 A1 | 4/1990 |

* cited by examiner

*Primary Examiner*—Ivars Cintins
(74) *Attorney, Agent, or Firm*—Norris McLaughlin & Marcus

(57) ABSTRACT

Strongly acid cation exchangers with improved properties are obtained if the sulphonation of the non-functionalized polymers is carried out at a high temperature and/or in the absence of oxygen.

7 Claims, 2 Drawing Sheets

PROCESS FOR THE PREPARATION OF LOW-BLEEDING CATION EXCHANGERS

The invention relates to a process for the preparation of strongly acid cation exchangers which have a reduced tendency to release impurities into their environment.

There is currently a large number of interesting uses for cation exchangers. They are thus employed, for example, for treatment of drinking water, for the preparation of extra-pure water (necessary in microchip production for the computer industry), for chromatographic separation of glucose and fructose and as catalysts for the most diverse chemical reactions (such as, for example, in the preparation of bisphenyol A from phenol and acetone). For most of these uses, it is desirable that the cation exchangers indeed fulfil their intended task, but do not release to their environment at all, or release in the smallest possible amounts, impurities which can originate from their preparation or are formed by polymer degradation during use.

In the past, attempts have been made to solve the problem by treating the ion exchangers with antioxidants (EP-A-366 258) or modifying them chemically (United States Patent Specification 3 342 755 and EP-A-502 619). Although these measures can reduce polymer degradation, they have no influence on the constituents which are formed during preparation of the ion exchangers—whether these are unreacted starting materials or low molecular weight non-crosslinked polymers. Attempts are made to remove these impurities by repeated washing out with water, which is expensive and brings only partial success.

The object of the invention was thus to provide a method for the preparation of ion exchangers which, from the beginning, comprise a greatly reduced level of impurities which bleed out. Surprisingly, it has been found that this object is achieved by sulphonation of the non-functionalized polymer at a high temperature and/or by sulphonation with exclusion of oxygen.

The invention thus relates to a process for the preparation of strongly acid cation exchangers by sulphonation of crosslinked styrene polymers at elevated temperature, characterized in that the sulphonation is carried out at temperatures from 125 to 150, preferably 130 to 145° C. and/or in the absence of oxygen. The terms "ion exchanger" and "cation exchanger" in the context of this invention also include sulphonated resins which are employed not for the purpose of the ion exchanger but as acid catalysts.

The base polymer used is a crosslinked polymer of ethylenically monounsaturated monomers, which chiefly comprise at least one compound from the series consisting of styrene, vinyltoluene, ethylstyrene, α-methylstyrene and derivatives thereof which are halogenated on the nucleus, such as chlorostyrene; in addition, they can also comprise one or more compounds from the series consisting of vinylbenzyl chloride, acrylic acid, its salts and its esters, in particular its methyl ester, and furthermore vinylnaphthalenes, vinylxylenes and the nitriles and amides of acrylic and methacrylic acids.

The polymers are crosslinked—preferably by copolymerization with crosslinking monomers having more than one, preferably having two or three, copolymerizable C=C double bond(s) per molecule. Such crosslinking monomers include, for example, polyfunctional vinyl aromatics, such as di- and trivinylbenzenes, divinylethylbenzene, divinyltoluene, divinylxylene, divinylethylbenzene, and divinylnaphthalene, polyfunctional allyl aromatics, such as di—and triallylbenzenes, polyfunctional vinyl—and allyl-heterocyclic compounds, such as trivinyl and triallylcyanurate and isocyanurate, N,N'-C-$C_6$-alkylenediacrylamides and -dimethacrylamides, such as N,N'-methylenediacrylamide and -dimethacrylamide and N,N'-ethylenediacrylamide and -dimethacrylamide, polyvinyl and polyallyl ethers of saturated $C_2$–$C_{20}$-polyols having 2 to 4 OH groups per molecule, such as, for example, ethylene glycol divinyl and diallyl ether and diethylene glycol divinyl and diallyl ether, esters of unsaturated $C_3$–$C_{12}$-alcohols or saturated $C_2$–$C_{20}$-polyols having 2 to 4 OH groups per molecule, such as allyl methacrylate, ethylene glycol di(meth)acrylate, glycerol tri(meth)acrylate, and pentaerythritol tetra(meth)acrylate, divinyletheyleneurea, divinylpropyleneurea, divinyl adipate and aliphatic and cycloaliphatic olefins having 2 or 3 isolated C=C double bonds, such as hexa-1,5-diene, 2,5-dimethylhexa-1,5-diene, octa-1,7-diene and 1,2,4-trivinylcyclohexane. Crosslinking monomers which have proved to be particularly appropriate are divinylbenzene (as an isomer mixture) and mixtures of divinylbenzene and aliphatic $C_6$–$C_{12}$-hydrocarbons having 2 or 3 C=C double bonds. The crosslinking monomers are in general employed in amounts of 1 to 80% by weight, preferably 2 to 25% by weight, based on the total amount of the polymerizable monomers employed.

The crosslinking monomers do not have to be employed in a pure form, but can also be employed in the form of their industrially handled mixtures of lesser purity (such as, for example, divinylbenzene mixed with ethylstyrene).

The copolymerization of monomer and crosslinking agent is usually initiated by agents which form free radicals and are soluble in the monomer. Preferred catalysts which form free radicals include, for example, diacyl peroxides, such as diacetyl peroxide, dibenzoyl peroxide, di-p-chlorobenzoyl peroxide and lauroyl peroxide, peroxy esters, such as tert-butyl peroxyacetate, tert-butyl peroctoate, tert-butyl peroxypivalate, tert-butyl peroxy-2-ethylhexanoate, tert-butyl peroxybenzoate and dicyclohexyl peroxydicarbonate, alkyl peroxides, such as bis-(tert-butyl peroxybutane), dicumyl peroxide and tert-butylcumyl peroxide, hydroperoxides such as cumene hydroperoxide and tert-butyl hydroperoxide, ketone peroxides, such as cyclohexanone hydroperoxide, methyl ethyl ketone hydroperoxide and acetylacetone peroxide, or—preferably—azoisobutyrodinitrile.

The agents which form free radicals can be employed in catalytic amounts, i.e. preferably amounts of 0.01 to 2.5, in particular 0.12 to 1.5% by weight, based on the sum of monomer and crosslinking agent.

The crosslinked base polymers can be prepared by known methods of suspension polymerization; cf. Ullmann's *Encyclopedia of Industrial Chemistry*, 5th Edition, Volume A21, 363–373, VCH Verlagsgesellschaft mbH, Weinheim 1992. The water-insoluble monomer/crosslinking agent mixture is added to an aqueous phase, which preferably comprises at least one protective colloid for stabilization of the monomer/crosslinking agent droplets of the disperse phase and of the bead polymers formed therefrom. Preferred protective colloids are naturally occurring and synthetic water-soluble polymers, such as, for example, gelatin, starch, polyvinyl alcohol, polyvinyl pyrrolidone, polyacrylic acid, polymethacrylic acid and copolymers of (meth)acrylic acid and (meth)acrylic acid esters. Cellulose derivatives, in particular cellulose ethers and cellulose esters, such as methylhydroxyethyl cellulose, methylhydroxypropyl cellulose, hydroxyethyl cellulose or carboxymethyl cellulose, are also particularly suitable. The amount of protective colloids employed is in general 0.02 to 1, preferably 0.05 to 0.3% by weight, based on the aqueous phase.

The weight ratio of aqueous phase/organic phase is in the range of preferably 0.5 to 20, in particular 0.75 to 5.

According to a particular embodiment of the present invention, the polymerization is carried out in the presence of a buffer system. Buffer systems which adjust the pH of the aqueous phase to a value between 14 and 6, preferably between 12 and 8, at the start of the polymerization are preferred. Under these conditions, protective colloids with carboxylic acid groups are present entirely or partly in the form of salts. The action of the protective colloids is influenced favourably in this manner. The concentration of buffer in the aqueous phase is preferably 0.5 to 500, in particular 2.5 to 100 mmol per litre of aqueous phase.

The organic phase can be distributed in the aqueous phase by stirring, the particle size of the droplets formed depending largely on the stirring speed. If bead polymers having a particle size which is as uniform as possible (in general called "monodisperse") are desired, suitable processes for this are to be preferred: for this purpose, the monomer stream can be sprayed into the aqueous phase, generation of droplets of uniform size being ensured, avoiding coalescence, by vibration-stimulated disintegration of the jet and/or microencapsulation of the monomer droplets formed (European patent specification 46 535 and 51 210).

If macroporous bead polymers are desired, porogens, such as are described, for example, by Seidl et al., *Adv. Polym. Sci.*, Vol. 5 (1967), pages 113 to 213, for example aliphatic hydrocarbons, alcohols, esters, ethers, ketones, trialkylamines or nitro compounds, preferably isododecane, isodecane, methyl isobutyl ketone or methylisobutylcarbonol, can be added to the monomer/crosslinking agent mixture in amounts of 1 to 150, preferably 40 to 100% by weight, in particular 50 to 80% by weight, based on the sum of monomer and crosslinking agent.

The polymerization temperature depends on the dissociation temperature of the initiator employed. It is in general between 50 and 150° C., preferably between 55 and 100° C. The polymerization lasts 0.5 to a few hours. It has proved appropriate to use a temperature programme with which the polymerization is started at a low temperature, for example 60° C., and the reaction temperature is increased as the polymerization conversion progresses.

The resulting bead polymers can be fed to the functionalization as such or through an intermediate stage of increased particle size which is accessible by so-called seed/feed process. A seed/feed process comprises the process steps of swelling the polymer originally obtained ("seed") with copolymerizable monomers ("feed"), and polymerizing the monomer which has penetrated into the polymer. Suitable seed/feed processes are described, for example, in European patent specification 98 130 and 101 943.

Preferred sulphonating agents include chlorosulphonic acid, sulphuric acid, sulphur trioxide and oleum, it being possible for the oleum preferably to comprise free sulphur trioxide in amounts of 1 to 100% by weight, based on the sulphuric acid. 90 to 98% strength by weight sulphuric acid is a preferred sulphonating agent.

The degree of substitution ($SO_3H$ groups per aromatic ring) of the polymer can be adjusted; by varying the sulphuric acid or oleum concentration. The average degree of substitution of the cation exchangers prepared according to the invention is preferably 0.6 to 2, in particular 0.8 to 1.8.

Before the sulphonation, the bead polymers can be swollen with a swelling agent in order to achieve uniform sulphonation of all the regions of the polymer beads. Preferred swelling agents include chlorinated aliphatic and aromatic hydrocarbons, such as methylene chloride, dichloromethane and chlorobenzene.

Another way of facilitating the sulphonation comprises employing for the sulphonation those base polymers which comprise 0.5 to 20% by weight of copolymerized acrylonitrile and/or methacrylonitrile, based on the sum of monomer and crosslinking agent; cf. German Auslegungsschrift 1 227 431 and 1 233 143.

Sulphonation under an inert gas atmosphere, for example a nitrogen atmosphere, is preferred according to the invention.

The sulphonation temperatures can be 50 to 200° C. However, the sulphonation is preferably carried out at temperatures from 125 to 150, in particular from 130 to 145° C.

Since the swelling agent optionally used cannot be removed completely by washing with water when the sulphonation has ended, but on the other hand ion exchangers with a content of swelling agent are unusable for many purposes (for example for processing of foodstuffs), they are as a rule driven out by distillation or with a stream of gas after the sulphonation. Removal of the swelling agent optionally used with the aid of a stream of inert gas, for example a stream of nitrogen, is preferred according to the invention.

To obtain the cation exchangers in a sulphonating agent-free form, they are subjected to various washes. For example, they can be washed with sulphuric acids of decreasing concentration and finally with water if desired, the cation exchangers which are then initially present in the hydrogen form can be converted into the corresponding salt form by treatment with aqueous salt solutions. Thus, for example, after treatment with aqueous sodium chloride/sodium hydroxide solution, they are in the sodium form.

The invention thus relates to 1. a process in which the sulphonation is carried out at 125 to 150, preferably 130 to 145° C.,
2. a process for the sulphonation with exclusion of oxygen and
3. a process which combines both features 1) and 2).

The cation exchangers prepared according to the invention have an increased total capacity (mol of $SO_3H$ per 1 of ion exchanger).

The cation exchangers prepared according to the invention in general have average particle sizes of 50 to 2000, preferably 200 to 1200 $\mu$m. The average particle size is the diameter below and above which in each case 50% by weight of the beads lie.

The cation exchangers prepared by the process according to the invention are almost completely free of impurities capable of bleeding; by washing them for a relatively short time they acquire a degree of purity which, in our experience, cation exchangers of the prior art do not reach even after long periods of washing.

The present invention thus also relates to cation exchangers with a conductivity profile of less than 50, preferably less than 40, and most preferably less than 30 $\mu$S/cm. The term "conductivity profile" in this connection refers to the electrical conductivity of washing water which has been obtained by the following process: 100 ml of a cation exchanger which has been stored in the absence of antioxidants for at least one month are suspended in water and introduced into a glass column (of a length of 30 cm and a diameter of 2 cm). Hot deionised water is then filtered through the column at a rate of 0.2 bed volumes/h; the temperature of the inflowing water is adjusted so that the eluate has a temperature of 70° C. on issuing from the column. 3 bed volumes of washing water are discarded; the eluate issuing from the column immediately thereafter is cooled to 20° C. and its electrical conductivity is determined at this temperature.

The invention also relates to the use of the cation exchangers according to the invention as catalysts for the most diverse chemical reactions. Examples of such reactions are alkylation reactions, such as for example of phenols with alkenes—such as the reaction of phenol and nonene to form nonyl phenyl; esterification reactions, such as for example of carboxylic acids with alcohols—such as the reaction of acrylic acid with methanol to form methyl acrylate; trans-esterification reactions of esters with other alcohols, carboxylic acids or esters—such as for example the reaction of methyl methacrylate and butanol to form butyl methacrylate; etherification reactions, such as for example of alkenes with alcohols or water—such as the reaction of methanol and isobutene to form MTBE or of methanol and 2-methyl-2-butene to form TAME; condensation reactions, such as for example of ketones and phenols—such as the reaction of acetone and phenol to form bisphenol A.

The cation exchangers according to the invention are also equally suitable for use as scavengers, such as for example for the decolouration of sugar or for the production of highly pure water.

A further important use is their use as cation exchangers for the preparation of highly pure products, such as for example for foodstuffs and drinks, and in particular drinking water.

The percentage data of the following examples in each case denote percentages by weight.

EXAMPLES

Figure 1:
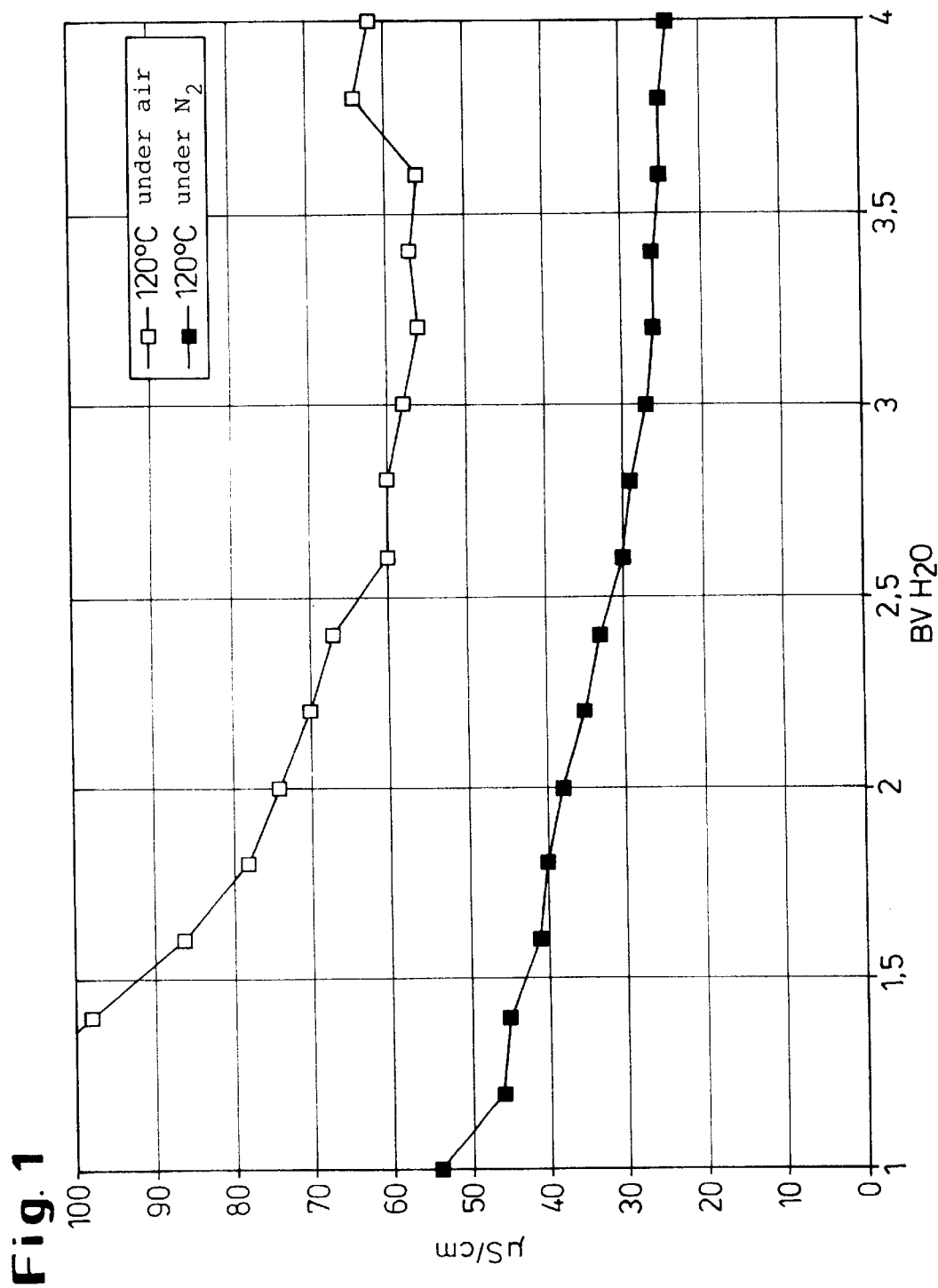
FIG. 1 shows conductivity profiles of cation exchangers which have been prepared in the presence or absence of atmospheric oxygen.

Preparation of Bead Polymers in Gel Form (Non-functionalized)

3.7 g of a protective colloid based on cellulose and 17 g of disodium hydrogen phosphate are dissolved in 1830 ml of desalinated water in a polymerization reactor. The aqueous solution is stirred at room temperature for 8 hours. 1000 g of monomer mixture comprising 936.5 g of styrene, 63.5 g of industrial divinyl-benzene (63% pure) and 7.4 g of dibenzoyl peroxide (75% pure) are then added. The mixture is stirred at 70° C. for 6 hours and at 90° C. for a further 3 hours. The resulting bead polymer is washed with water and then dried at 80° C. in a drying cabinet.

Yield: 98.1% by weight.

Example 1

Sulphonation of the Bead Polymer in Air at 120° C. 367.5 g of 78% strength sulphuric acid are initially introduced at room temperature into a reaction vessel which has an open access to an atmosphere of air. 150 g of bead polymer are added. 37.5 ml of 1,2-dichloroethane are metered in, while stirring, and the mixture is stirred at room temperature for a further 3 hours. 783 g of sulphuric acid monohydrate are then metered in. The mixture is heated to 120° C. Dichloroethane already distils off during the heating. The mixture is stirred at 120° C. for a further 4 hours. After stirring at 120° C. for 3.5 hours, air is blown through the suspension at 120° C. for 30 minutes to remove the dichloroethane residues still present.

The suspension is transferred to a column and charged from the top and hydrated with various sulphuric acids of decreasing concentration and finally with water.

Yield of cation exchanger in the H form: 1050 ml; Total capacity: 1.28 mol/l.

Example 2

Sulphonation of the Bead Polymer at 120° C. With Exclusion of Air

All the operations are carried out under nitrogen (i.e. with exclusion of air). 367.5 g of 78% strength sulphuric acid are initially introduced at room temperature into a reaction vessel which is rendered inert with nitrogen. 150 g of bead polymer are added. 37.5 ml of 1,2-dichloroethane are metered in, while stirring, and the mixture is stirred at room temperature for a further 3 hours. 783 g of sulphuric acid monohydrate are then metered in. The mixture is heated to 120° C. Dichloroethane already distils off during the heating. The mixture is stirred at 120° C. for a further 4 hours. After stirring at 120° C. for 3.5 hours, nitrogen is blown through the suspension at 120° C. for 30 minutes to remove dichloroethane residues still present.

The suspension is transferred to a column and charged from the top and hydrated with various sulphuric acids of decreasing concentration and finally with water.

Yield of cation exchanger in the H form: 990 ml; Total capacity: 1.37 mol/l.

Example 3

Sulphonation of the Bead Polymer at 130° C. in Air 367.5 g of 78% strength sulphuric acid are initially introduced at room temperature into a reaction vessel which has an open access to an atmosphere of air. 150 g of bead polymer are added. 37.5 ml of 1,2-dichloroethane are metered in, while stirring, and the mixture is stirred at room temperature for a further 3 hours. 783 g of sulphuric acid monohydrate are then metered in. The mixture is heated to 130° C. Dichloroethane already distils off during the heating. The mixture is stirred at 130° C. for a further 4 hours. After stirring at 130° C. for 3.5 hours, air is blown through the suspension at 130° C. for 30 minutes to remove dichloroethane residues still present.

The suspension is transferred to a column and charged from the top and hydrated with various sulphuric acids of decreasing concentration and finally with water.

Yield of cation exchanger in the H form: 1050 ml; Total capacity: 1.30 mol/l.

Example 4

Sulphonation of the Bead Polymer at 130° C. With Exclusion of Air

All the operations are carried out under nitrogen (i.e. with exclusion of air). 367.5 g of .78% strength sulphuric acid are initially introduced at room temperature into a reaction vessel which is rendered inert with nitrogen. 150 g of bead polymer are added. 37.5 ml of 1,2-dichloroethane are metered in, while stirring, and the mixture is stirred at room temperature for a further 3 hours. 783 g of sulphuric acid monohydrate are then metered in. The mixture is heated to 130° C. Dichloroethane already distils off during the heating. The mixture is stirred at 130° C. for a further 4 hours. After stirring at 130° C. for 3.5 hours, nitrogen is blown through the suspension at 130° C. for 30 minutes to remove dichloroethane residues still present.

The suspension is transferred to a column and charged from the top and hydrated with various sulphuric acids of decreasing concentration and finally with water.

Yield of cation exchanger in the H form: 1050 ml; Total capacity: 1.36 mol/l.

Example 5
Sulphonation of the Bead Polymer at 140° C. in Air 367.5 g of 78% strength sulphuric acid are initially introduced at room temperature into a reaction vessel which has an open access to an atmosphere of air. 150 g of bead polymer are added. 37.5 ml of 1,2-dichloroethane are metered in, while stirring, and the mixture is stirred at room temperature for a further 3 hours. 783 g of sulphuric acid monohydrate are then metered in. The mixture is heated to 140° C. Dichloroethane already distils off during the heating. The mixture is stirred at 140° C. for a further 4 hours. After stirring at 140° C. for 3.5 hours, air is blown through the suspension at 140° C. for 30 minutes to remove dichloroethane residues still present.

The suspension is transferred to a column and charged from the top and hydrated with various sulphuric acids of decreasing concentration and finally with water.

Yield of cation exchanger in the H form: 1050 ml; Total capacity: 1.31 mol/l.

Example 6
Sulphonation of the Bead Polymer at 140° C. With Exclusion of Air

All the operations are carried out under nitrogen (i.e. with exclusion of air). 367.5 g of 78% strength sulphuric acid are initially introduced at room temperature into a reaction vessel which is rendered inert with nitrogen. 150 g of bead polymer are added. 37.5 ml of 1,2-dichloroethane are metered in, while stirring, and the mixture is stirred at room temperature for a further 3 hours. 783 g of sulphuric acid monohydrate are then metered in. The mixture is heated to 140° C. Dichloroethane already distils off during the heating. The mixture is stirred at 140° C. for a further 4 hours. After stirring at 140° C. for 3.5 hours, nitrogen is blown through the suspension at 140° C. for 30 minutes to remove dichloroethane residues still present.

The suspension is transferred to a column and charged from the top and hydrated with various sulphuric acids of decreasing concentration and finally with water.

Yield of cation exchanger in the H form: 1030 ml; Total capacity: 1.34 mol/l.

| Example | Sulphonation under atmospheric oxygen (A) or nitrogen (B) | Sulphonation temperature in ° C. | Yield of cation exchanger in the hydrogen form in ml | Total capacity in mol/l | mmol of $SO_3H$ groups in the cation exchanger per gram of bead polymer employed here | Capacity yield in mmol |
|---|---|---|---|---|---|---|
| 1 | A | 120 | 1050 | 1.28 | 8.96 | 1344 |
| 2 | B | 120 | 990 | 1.37 | 9.04 | 1356.3 |
| 3 | A | 130 | 1050 | 1.30 | 9.1 | 1365 |
| 4 | B | 130 | 1050 | 1.36 | 9.2 | 1380.4 |
| 5 | A | 140 | 1050 | 1.31 | 9.17 | 1375.5 |
| 6 | B | 140 | 1030 | 1.34 | 9.2 | 1380.5 |

Total capacity (TC): Amount of $SO_3H$ groups in mol per litre of cation exchanger in the H form.

Capacity yield: Product of TC and the volume yield of cation exchanger.

FIG. 1 shows conductivity profiles of cation exchangers which have been prepared in the presence or absence of atmospheric oxygen.

To determine the conductivity profiles, water is filtered over the cation exchangers and the conductivity in S/cm is measured in the eluate.

FIG. 1 shows that the cation exchangers prepared under nitrogen release significantly smaller amounts of substances which contribute towards conductivity, and therefore release a substantially purer water.

Figure 2:
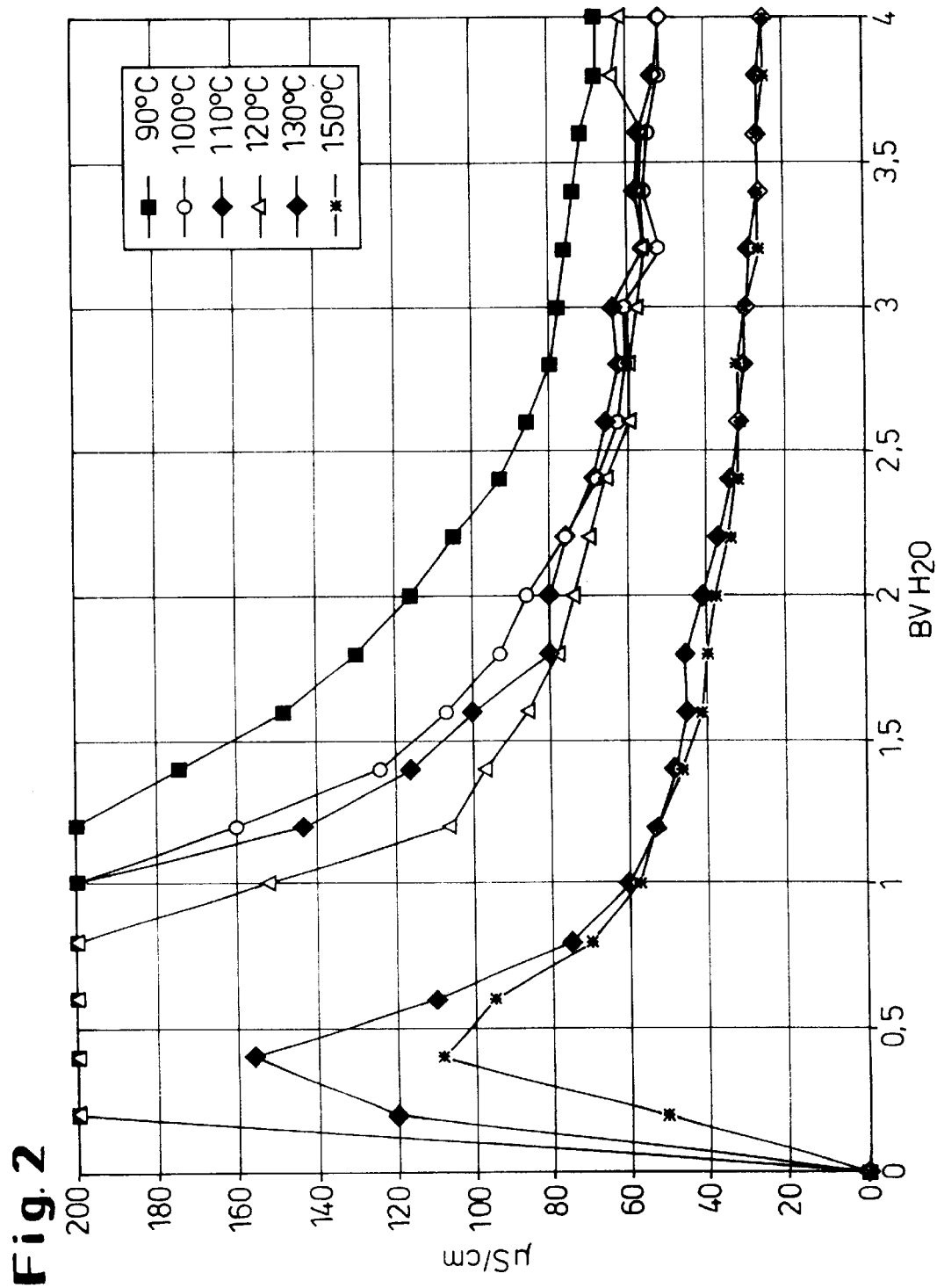
FIG. 2 shows conductivity profiles of cation exchangers sulfonated at different temperatures.

FIG. 2 shows that the products sulphonated at a higher temperature release smaller amounts of substances than products sulphonated at a low temperature.

What is claimed is:

1. Process for the preparation of strongly acid cation exchangers having a particle size of 50 to 2000 μm comprising sulphonating crosslinked styrene polymers under an inert gas atmosphere at a temperature ranging from 130 to 150° C. with chlorosulphonic acid, sulphuric acid or sulphuric acid monohydrate, in the presence of a swelling agent selected from the group consisting of chlorinated aliphatic and aromatic hydrocarbons, for a time sufficient to produce cation exchangers which, when washed with 3 bed volumes of deionised waiter at a rate of 0.2 bed volumes per hour through a column containing 100 ml of said cation exchangers, at a temperature sufficient to produce an elutate having a temperature of 70° C., have a conductivity profile of less than 50 μS/cm.

2. Process according to claim 1, in which the sulphonation is carried out at temperatures from 130 to 145° C.

3. Process according to claim 1, wherein, after the sulphonation, the swelling agent is blown out with inert gas.

4. Process according to claim 1, in which crosslinked styrene polymers comprising 0.5 to 20% by weight of copolymerized acrylonitrile methacrylonitrile, or both, based on the sum of monomer and crosslinking agent, are sulphonated.

5. Process according to claim 1, wherein said crosslinked. styrene polymers are in the form of beads, the particle size of which have been increase by absorbing copolymerizable monomers into the beads to swell them, and then Polymerizing the monomers which have Penetrated into the beads.

6. Process for the preparation of strongly acid cation exchangers according to claim 1 wherein the styrene polymers are crosslinked with monomers having more than one copolymerizable C=C double bond(s) per molecule.

7. Process according to claim 1 wherein the monomer having more than one copolymerizable C=C double bond per molecule is divinylbenzene.

* * * * *